(12) United States Patent
Hara et al.

(10) Patent No.: US 9,493,052 B2
(45) Date of Patent: Nov. 15, 2016

(54) VEHICLE AIR CONDITIONING DEVICE

(75) Inventors: Junichiro Hara, Tokyo (JP); Tomoki Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 740 days.

(21) Appl. No.: 13/517,162

(22) PCT Filed: May 24, 2011

(86) PCT No.: PCT/JP2011/061861
§ 371 (c)(1),
(2), (4) Date: Jul. 18, 2012

(87) PCT Pub. No.: WO2011/152247
PCT Pub. Date: Dec. 8, 2011

(65) Prior Publication Data
US 2013/0065498 A1 Mar. 14, 2013

(30) Foreign Application Priority Data
May 31, 2010 (JP) ................. 2010-124742

(51) Int. Cl.
*B60H 1/34* (2006.01)
*B60H 1/00* (2006.01)

(52) U.S. Cl.
CPC ................. *B60H 1/00857* (2013.01)

(58) Field of Classification Search
CPC ........................................ B60H 1/34
USPC ........................ 454/155, 143, 152
See application file for complete search history.

(56) References Cited

U.S. PATENT DOCUMENTS

| | | | | |
|---|---|---|---|---|
| 5,470,276 A | * | 11/1995 | Burnell et al. | 454/155 |
| 5,954,579 A | * | 9/1999 | Masui et al. | 454/125 |
| 6,254,474 B1 | * | 7/2001 | Davidsson | 454/69 |

(Continued)

FOREIGN PATENT DOCUMENTS

| | | |
|---|---|---|
| CN | 2936811 Y | 8/2007 |
| JP | 03-109910 U | 11/1991 |

(Continued)

OTHER PUBLICATIONS

Chinese Office Action dated Jan. 27, 2014, issued in corresponding Chinese Patent Application No. 201180005088.0, w/English translation (11 pages).

(Continued)

*Primary Examiner* — Steven B McAllister
*Assistant Examiner* — Samantha Miller
(74) *Attorney, Agent, or Firm* — Westerman, Hattori, Daniels & Adrian, LLP

(57) ABSTRACT

Provided is a vehicle air conditioning device, in which a plurality of blow-off mode switching dampers are turned by a link mechanism, for enabling selective switching of blow-off modes, the link mechanism including: levers respectively provided to rotating shafts; and a turnable link including a plurality of cam grooves on each of which a pin provided to each lever slides. A rail portion is provided in any one of an inner side surface of the cam groove and an outer peripheral surface of each pin, and the cam groove and the pin are in contact with each other through the rail portion. Accordingly, it is possible to suppress abnormal noise that is generated when foreign substances are caught in a sliding surface (rail surface) between the cam groove and the pin.

6 Claims, 12 Drawing Sheets

(56) References Cited

U.S. PATENT DOCUMENTS

| | | | |
|---|---|---|---|
| 7,510,165 B2* | 3/2009 | Heshmati | 251/64 |
| 2003/0157880 A1* | 8/2003 | Nishida et al. | 454/155 |
| 2004/0127153 A1* | 7/2004 | Demerath | 454/155 |
| 2005/0056397 A1* | 3/2005 | Enomoto et al. | 165/42 |
| 2006/0030255 A1* | 2/2006 | Seki | 454/121 |
| 2008/0182500 A1* | 7/2008 | Jessen et al. | 454/155 |
| 2008/0254732 A1* | 10/2008 | Voigt et al. | 454/143 |
| 2009/0305623 A1* | 12/2009 | Lange et al. | 454/121 |
| 2010/0087133 A1* | 4/2010 | Kleinow et al. | 454/152 |
| 2010/0120347 A1* | 5/2010 | Gehring et al. | 454/155 |
| 2011/0059685 A1* | 3/2011 | Ido | 454/69 |

FOREIGN PATENT DOCUMENTS

| | | |
|---|---|---|
| JP | 4-70952 U | 6/1992 |
| JP | 05-005518 U | 1/1993 |
| JP | 07-315035 A | 12/1995 |
| JP | 10-100644 A | 4/1998 |
| JP | 2004-218819 A | 8/2004 |
| JP | 2006-88810 A | 4/2006 |
| JP | 2006-137350 A | 6/2006 |
| JP | 2007-55370 A | 3/2007 |
| JP | 2007-193767 A | 8/2007 |
| JP | 2008-296746 A | 12/2008 |

OTHER PUBLICATIONS

Japanese Decision to grant a Patent dated Sep. 2, 2014, issued in Japanese Patent Application No. 2010-124742, w/English translation (7 pages).

International Search Report of PCT/JP2011/061861, mailing date Aug. 23, 2011.

Chinese Notice of Allowance dated Dec. 4, 2014, issued in corresponding CN Application No. 201180005088.0 (2 pages). Explanation of Relevance—"The Notice of Allowance has been received".

* cited by examiner

VEHICLE AIR CONDITIONING DEVICE

TECHNICAL FIELD

The present invention relates to a vehicle air conditioning device that can selectively switch blow-off modes of temperature-regulated air by turning a plurality of blow-off mode switching dampers provided for blow-off channels.

BACKGROUND ART

In a heating ventilation and air conditioning unit (HVAC unit) of an air conditioning device mounted in a vehicle, an evaporator, an air mixing damper, a heater core, and the like are sequentially provided from the upstream side in an air flow channel in a unit case. Temperature-regulated air having temperature regulated by those components is selectively blown off by means of a plurality of blow-off mode switching dampers into a chamber from any of a face blow-off channel, a foot blow-off channel, and a defroster blow-off channel that are provided downstream of those components.

In such a HVAC unit, the plurality of blow-off mode switching dampers are provided so as to be turnable by a link mechanism. The link mechanism includes: a lever provided to a rotating shaft of each blow-off mode switching damper; and a turnable ring including a plurality of cam grooves on each of which a pin provided to the lever slides. When the link of the link mechanism is turned by an actuator, each blow-off mode switching damper is turned at predetermined timing, and a face blow-off channel, a foot blow-off channel, and a defroster blow-off channel can thus be selectively opened/closed (see, for example, PTL 1, PTL 2, and PTL 3).

A blow-off mode, in which the temperature-regulated air is blown off into the chamber from the face blow-off channel, the foot blow-off channel, and the defroster blow-off channel, generally includes five blow-off modes of: a face mode in which the temperature-regulated air is blown off from the face blow-off channel; a high level mode in which the temperature-regulated air is blown off from both the face blow-off channel and the foot blow-off channel; a foot mode in which the temperature-regulated air is blown off from the foot blow-off channel; a defroster/foot mode in which the temperature-regulated air is blown off from both the foot blow-off channel and the defroster blow-off channel; and a defroster mode in which the temperature-regulated air is blown off from the defroster blow-off channel. The five blow-off modes can be switched by switching the plurality of blow-off mode switching dampers.

CITATION LIST

Patent Literature

{PTL 1}
Japanese Unexamined Patent Application, Publication No. Hei 10-100644
{PTL 2}
Japanese Unexamined Patent Application, Publication No. 2006-137350
{PTL 3}
Japanese Unexamined Patent Application, Publication No. 2008-296746

SUMMARY OF INVENTION

Technical Problem

Unfortunately, in the link mechanism that turns the blow-off mode switching dampers, as disclosed in PTL 1 to PTL 3, the pin of the lever provided to the rotating shaft of each damper is slidably fitted into each cam groove provided in the turnable link. Consequently, when one of the blow-off mode switching dampers is pushed against a position at which the blow-off mode switching damper fully closes a blow-off channel, repulsive force caused by a seal member or the like is applied to a sliding surface between the cam groove and the pin, and large sliding frictional force is thus generated when the link is turned, resulting in an unfavorable decrease in operability.

Accordingly, the operability is increased by, for example, applying grease to the sliding surface of the cam groove, but this unfavorably causes a decrease in assembly efficiency and an increase in costs. In the case where the grease is applied and where foreign substances such as fine dusts enter the grease, the foreign substances are more easily attached to and stay in the sliding surface between the pin and the cam groove. When the foreign substances are caught in the sliding surface, the foreign substances unfavorably generate abnormal noise, and decrease sliding properties.

The present invention, which has been made in view of the above-mentioned circumstances, has an object to provide a vehicle air conditioning device that can prevent abnormal noise that is generated when foreign substances are caught in a link mechanism that turns blow-off mode switching dampers, increase the operability of the link mechanism, and eliminate the need to apply grease.

Solution to Problem

In order to solve the above-mentioned problems, a vehicle air conditioning device of the present invention adopts the following solutions.

That is, the vehicle air conditioning device according to the present invention includes: a plurality of blow-off mode switching dampers that are turnably provided in a plurality of blow-off channels that blow off temperature-regulated air into a chamber; and a link mechanism including: a lever provided to a rotating shaft of each blow-off mode switching damper; and a turnable link including a plurality of cam grooves on each of which a pin provided to the lever slides, the blow-off mode switching dampers being turned by the link mechanism, for enabling selective switching of blow-off modes. A rail portion is provided in any one of an inner side surface of each cam groove and an outer peripheral surface of each pin, and the cam groove and the pin are in contact with each other through the rail portion.

In the vehicle air conditioning device according to the present invention, the plurality of blow-off mode switching dampers are turned by the link mechanism, for enabling the selective switching of the blow-off modes, the link mechanism including: the lever provided to the rotating shaft of each blow-off mode switching damper; and the turnable link including the plurality of cam grooves on each of which the pin provided to the lever slides. The rail portion is provided in any one of the inner side surface of each cam groove and the outer peripheral surface of each pin, and the cam groove and the pin are in contact with each other through the rail portion. With this configuration, even if foreign substances such as fine dusts enter a sliding portion between the cam groove and the pin, the foreign substances are cleared into lower portions on both sides of the rail portion, so that the foreign substances can be less likely to be caught in a rail surface on which the cam groove and the pin are in contact with each other. Accordingly, it is possible to suppress abnormal noise that is generated when the foreign substances are caught in the sliding surface (rail surface)

between the cam groove and the pin. The contact surface between the cam groove and the pin is made smaller by providing the rail portion, and sliding frictional force can thus be reduced. Hence, the operability of the link mechanism can be enhanced. As a result, grease does not need to be applied to the sliding surface of the cam groove in order to increase sliding properties, and such elimination of the need to apply grease can enhance assembly efficiency and reduce costs.

Further, according to a vehicle air conditioning device of a first aspect of the present invention, in the above-mentioned vehicle air conditioning device, the rail portion is formed integrally by forming, into a linear protrusion, part of the inner side surface of the cam groove or the outer peripheral surface of the pin.

According to the vehicle air conditioning device of the first aspect of the present invention, the rail portion is formed integrally by forming, into the linear protrusion, part of the inner side surface of the cam groove or the outer peripheral surface of the pin. Hence, the rail portion having a given rail width and a given rail height can be easily formed integrally with the inner side surface of the cam groove or the outer peripheral surface of the pin by forming part thereof into the linear protrusion. Accordingly, it is possible to easily form the rail portion having the best width and height to reduce the catching of foreign substances and the sliding frictional force, while suppressing an increase in costs caused by separately providing the rail portion.

Further, according to a vehicle air conditioning device of a second aspect of the present invention, in any of the above-mentioned vehicle air conditioning devices, the rail portion is obliquely provided at a predetermined inclination on the inner side surface of the cam groove or the outer peripheral surface of the pin.

According to the vehicle air conditioning device of the second aspect of the present invention, the rail portion is obliquely provided at the predetermined inclination on the inner side surface of the cam groove or the outer peripheral surface of the pin. Hence, the position of the contact surface of the pin or the cam groove that comes into contact with the rail portion can be changed with respect to the axial direction (length direction) of the pin or the width direction of the cam groove. Accordingly, it is possible to avoid intensive abrasion of the contact surface of the pin or the cam groove, prevent an increase in operation torque due to sliding friction, stabilize the operability of the link mechanism, and effectively suppress the generation of abnormal noise and the like.

Further, according to a vehicle air conditioning device of a third aspect of the present invention, in any of the above-mentioned vehicle air conditioning devices, the rail portion is provided on the inner side surface of the cam groove in only a region in which sliding frictional force is increased by reactive force that is caused when one of the blow-off mode switching dampers is pushed against a full-close position thereof.

According to the vehicle air conditioning device of the third aspect of the present invention, the rail portion is provided on the inner side surface of the cam groove in only the region in which the sliding frictional force is increased by the reactive force that is caused when one of the blow-off mode switching dampers is pushed against the full-close position thereof. That is, the rail portion is provided in only the region in which the sliding frictional force between the cam groove and the pin is increased by the reactive force that is caused when the blow-off mode switching damper is turned by the link mechanism to be pushed against a seal surface at the position at which the blow-off mode switching damper fully closes a blow-off channel. With this configuration, the sliding frictional force between the cam groove and the pin in that region can be effectively reduced. Accordingly, it is possible to enhance the operability of the link mechanism, and eliminate the need to apply grease. In particular, when the blow-off mode switching damper is pushed against the full-close position thereof, the rotating shaft receives turning force in the opposite direction due to repulsive force caused by a seal packing or the like, and the received force is applied to the contact surface between the lever and the cam groove. Accordingly, it is possible to solve such a trouble that large frictional force, which is generated when the link is turned, causes a decrease in the operability of the link mechanism as well as abnormal noise that is generated when foreign substances are caught in. In a region in which the blow-off mode switching damper is turned, large sliding frictional force is not generated.

Further, according to a vehicle air conditioning device of a fourth aspect of the present invention, in the above-mentioned vehicle air conditioning device, the rail portion is provided in a range in which the link is turned while a defroster/face damper provided between a defroster blow-off channel and a face blow-off channel of the blow-off channels is pushed by the link mechanism against a position at which the defroster/face damper fully closes the defroster blow-off channel or part of the face blow-off channel.

According to the vehicle air conditioning device of the fourth aspect of the present invention, the rail portion is provided in the range in which the link is turned while the defroster/face damper provided between the defroster blow-off channel and the face blow-off channel of the blow-off channels is pushed by the link mechanism against the position at which the defroster/face damper fully closes the defroster blow-off channel or part of the face blow-off channel. Hence, when the blow-off mode of the temperature-regulated air is switched between a face mode (a mode in which the temperature-regulated air is blown off from only the face blow-off channel) and a high level mode (a mode in which the temperature-regulated air is blown off from both the face blow-off channel and a foot blow-off channel), the defroster/face damper as one of the blow-off mode switching dampers needs to be maintained so as to fully close the defroster blow-off channel. In addition, when the blow-off mode is switched among a foot mode (a mode in which the temperature-regulated air is blown off from only the foot blow-off channel), a defroster/foot mode (a mode in which the temperature-regulated air is blown off from both the foot blow-off channel and the defroster blow-off channel), and a defroster mode (a mode in which the temperature-regulated air is blown off from only the defroster blow-off channel), the defroster/face damper needs to be maintained so as to fully close part of the face blow-off channel, that is, a center face blow-off channel. In such a range as described above, the rail portion is provided on the inner side surface of the cam groove, whereby the sliding frictional force that is generated when the link is turned can be effectively reduced. Accordingly, it is possible to enhance the operability of the link mechanism, eliminate the need to apply grease, and effectively suppress the generation of abnormal noise and the like.

Advantageous Effects of Invention

According to the present invention, even if foreign substances such as fine dusts enter the sliding portion between the cam groove and the pin, the foreign substances are cleared into the lower portions on both sides of the rail portion, so that the foreign substances can be less likely to be caught in the rail surface on which the cam groove and the pin are in contact with each other. Accordingly, it is possible to suppress abnormal noise that is generated when the foreign substances are caught in the sliding surface (rail surface) between the cam groove and the pin. The contact surface between the cam groove and the pin is made smaller by providing the rail portion, and sliding frictional force can thus be reduced. Hence, the operability of the link mechanism is enhanced, grease does not need to be applied to the sliding surface of the cam groove in order to increase sliding properties, and such elimination of the need to apply grease can enhance assembly efficiency and reduce costs.

DESCRIPTION OF EMBODIMENTS

Hereinafter, embodiments according to the present invention are described with reference to the drawings.
{First Embodiment}
A first embodiment of the present invention is described below with reference to FIG. 1 to FIG. 13.

Figure 1:
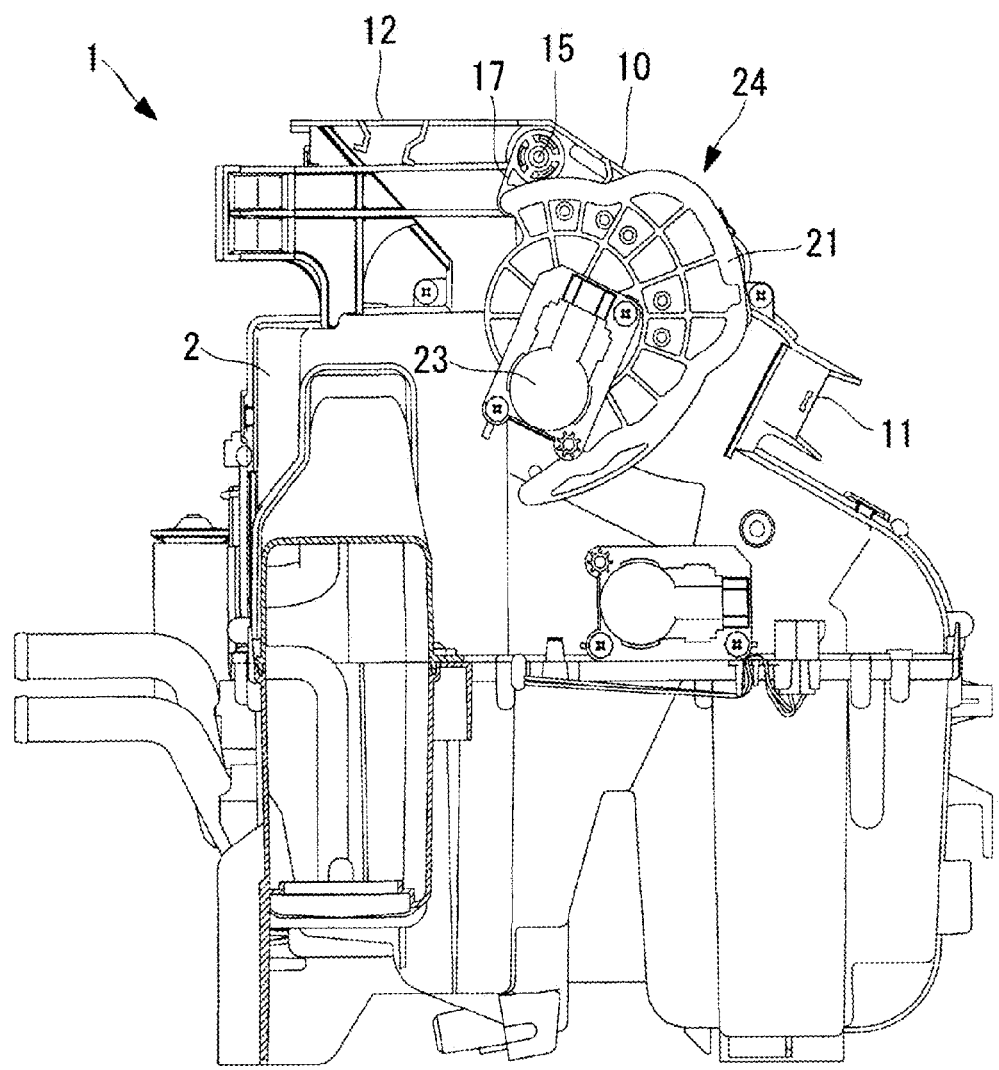
FIG. 1 is a side view of a vehicle air conditioning device (HVAC unit) according to a first embodiment of the present invention.
Figure 2:
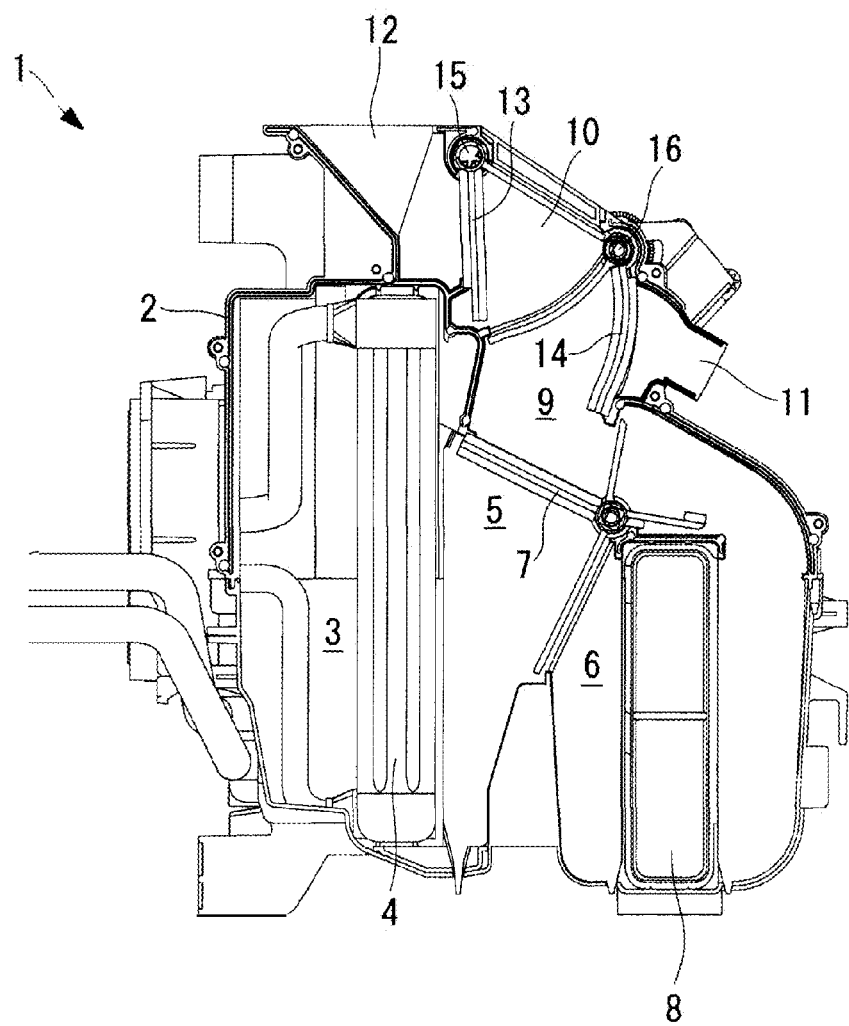
FIG. 2 is a longitudinal sectional view of the HVAC unit illustrated in FIG. 1.

FIG. 1 illustrates a side view of a vehicle air conditioning device (HVAC unit) according to the first embodiment of the present invention, and FIG. 2 illustrates a longitudinal sectional view thereof.

A vehicle air conditioning device (heating ventilation and air conditioning unit; HVAC unit) 1 includes a unit case 2, and the unit case 2 is configured by integrally coupling a plurality of divided cases formed by vertically and horizontally dividing the unit case 2.

As illustrated in FIG. 2, an air flow channel 3 is formed in the unit case 2. The air flow channel 3 changes the direction of an air flow fed from a blower unit (not illustrated) into the front-back direction (the left-right direction of FIG. 2), and circulates the air flow to the downstream side. An evaporator 4 is substantially vertically provided upstream of the air flow channel 3, and the evaporator 4 constitutes a refrigeration cycle (not illustrated). The air flow channel 3 is branched into a bypass flow channel 5 and a heating flow channel 6, downstream of the evaporator 4. An air mixing damper 7 is provided at the branched portion into the bypass flow channel 5 and the heating flow channel 6, and the air mixing damper 7 enables the adjustment of a flow ratio of air flows to be circulated into the bypass flow channel 5 and the heating flow channel 6. A heater core 8 is substantially vertically provided in the heating flow channel 6, and cooling water from an engine cooling water circuit (not illustrated) is circulated in the heater core 8.

The bypass flow channel 5 and the heating flow channel 6 join together in an air mixing region 9 downstream of the air mixing damper 7, and are communicated with three blow-off channels formed downstream of the air mixing region 9, that is, a face blow-off channel 10, a foot blow-off channel 11, and a defroster blow-off channel 12. A defroster/face damper (blow-off mode switching damper) 13 is provided between the face blow-off channel 10 and the defroster blow-off channel 12. A foot damper (blow-off mode switching damper) 14 is provided at an entrance of the foot blow-off channel 11.

As illustrated in FIG. 2, the defroster/face damper 13 can be turned about a rotating shaft 15 between: a position at which the defroster/face damper 13 fully closes a center face blow-off channel constituting part of the face blow-off channel 10; and a position at which the defroster/face damper 13 fully closes the defroster blow-off channel 12. Meanwhile, the foot damper 14 can be turned about a rotating shaft 16 between: a position at which the foot damper 14 fully closes the foot blow-off channel 11; and a position at which the foot damper 14 fully closes a flow channel leading to the face blow-off channel 10 and the defroster blow-off channel 12. The foot damper 14 and the defroster/face damper 13 can be turned by a link mechanism 24 to be described later, to a position corresponding to each blow-off mode.

The defroster/face damper 13 and the foot damper 14 constitute a plurality of blow-off mode switching dampers. The blow-off mode of temperature-regulated air that is blown off into a chamber can be selectively switched by opening/closing the blow-off mode switching dampers, among five blow-off modes of: a face mode in which the temperature-regulated air is blown off from the face blow-off channel 10; a high level mode in which the temperature-regulated air is blown off from both the face blow-off channel 10 and the foot blow-off channel 11; a foot mode in which the temperature-regulated air is blown off from the foot blow-off channel 11; a defroster/foot mode in which the temperature-regulated air is blown off from both the foot blow-off channel 11 and the defroster blow-off channel 12;

and a defroster mode in which the temperature-regulated air is blown off from the defroster blow-off channel 12.

The defroster/face damper 13 and the foot damper 14 are turnably supported by the unit case 2 through the rotating shafts 15 and 16, respectively. One ends of the rotating shafts 15 and 16 protrude from a side surface of the unit case 2. Levers 17 and 18 (see FIGS. 9 to 13) are respectively provided at the protruding end parts. Further, pins 19 and 20 (see FIGS. 9 to 13) are respectively provided at leading ends of the levers 17 and 18. The levers 17 and 18 and the pins 19 and 20 are integrally molded products of a resin material, and the material used therefor (for example, polyacetal (POM)) has excellent sliding properties and lubricating properties.

A link 21 is turnably provided on the side surface of the unit case 2 through a shaft portion 22 (see FIGS. 4 and 5) at a position having predetermined distances from the rotating shafts 15 and 16, and the link 21 serves to turn the rotating shafts 15 and 16, that is, the defroster/face damper 13 and the foot damper 14. The link 21 is rotationally driven about the shaft portion 22 by an actuator 23 provided on the side surface of the unit case 2. The link 21, the actuator 23, the levers 17 and 18, and the like constitute the link mechanism 24 that turns the defroster/face damper 13 and the foot damper 14.

As illustrated in FIG. 3 to FIG. 8, the link 21 is a plate-like integrally molded product of a resin material, and is provided with a plurality of reinforcing ribs in the radial direction and the circumferential direction, and the material used therefor (for example, polypropylene (PP)) has high strength and hardness. The shaft portion 22 is provided in the center of the link 21, and two cam grooves 25 and 26 are provided in the periphery of the link 21. The pins 19 and 20 of the levers 17 and 18 are slidably fitted to the cam grooves 25 and 26, respectively. The configuration of the cam grooves 25 and 26 is described below in detail.

Figure 4:
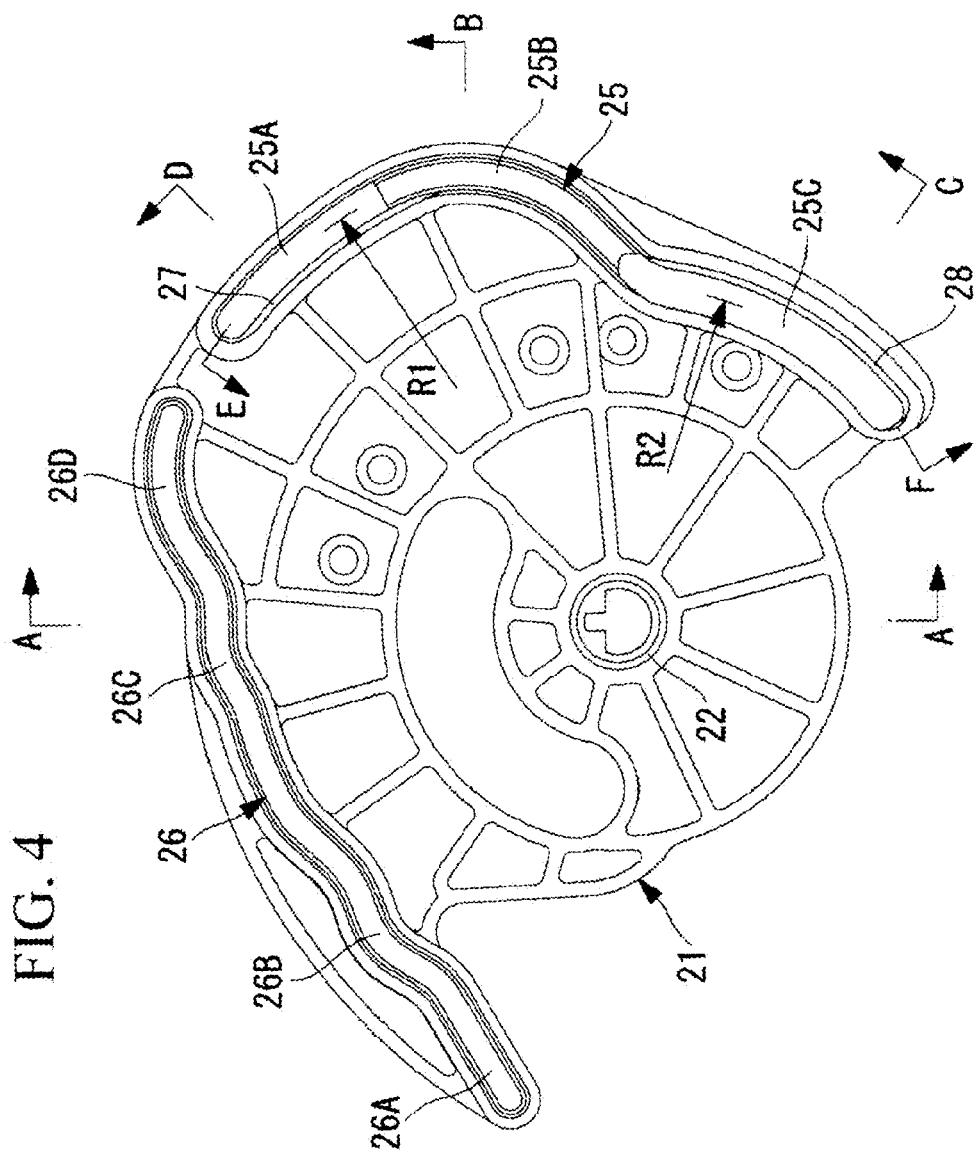
FIG. 4 is a rear view of the link illustrated in FIG. 3.

The cam groove 25 is a groove to which the pin 19 of the lever 17 is slidably fitted. As illustrated in FIG. 4, the cam groove 25 includes: a groove portion (a groove in a region in which the damper is kept at its full-close position) 25A having a predetermined angular width; and a groove portion 25B having a predetermined angular width. The groove portion 25A is an arc-like groove having a radius R1 from the center of the shaft portion 22. While the link 21 is rotated clockwise (in FIG. 4, rotated counterclockwise) from a face mode position illustrated in FIG. 9 to a high level mode position illustrated in FIG. 10, the groove portion 25A holds the lever 17 at its position without turning the lever 17, and keeps the defroster/face damper 13 at the position at which the defroster/face damper 13 fully closes the defroster blow-off channel 12. Then, the groove portion 25B is continuous with the groove portion 25A. While the link 21 is rotated clockwise from the high level mode position illustrated in FIG. 10 to a foot mode position illustrated in FIG. 11, the groove portion 25B turns the lever 17 through a portion thereof having a gradually reduced radius, and turns the defroster/face damper 13 from the position at which the defroster/face damper 13 fully closes the defroster blow-off channel 12 to the position at which the defroster/face damper 13 fully closes part of the face blow-off channel 10, that is, the center face blow-off channel.

The cam groove 25 further includes a groove portion (a groove in a region in which the damper is kept at its full-close position) 25C having a predetermined angular width. The groove portion 25C is an arc-like groove having a radius R2 (R2<R1) from the center of the shaft portion 22, and is continuous with one end of the groove portion 25B.

Figure 11:
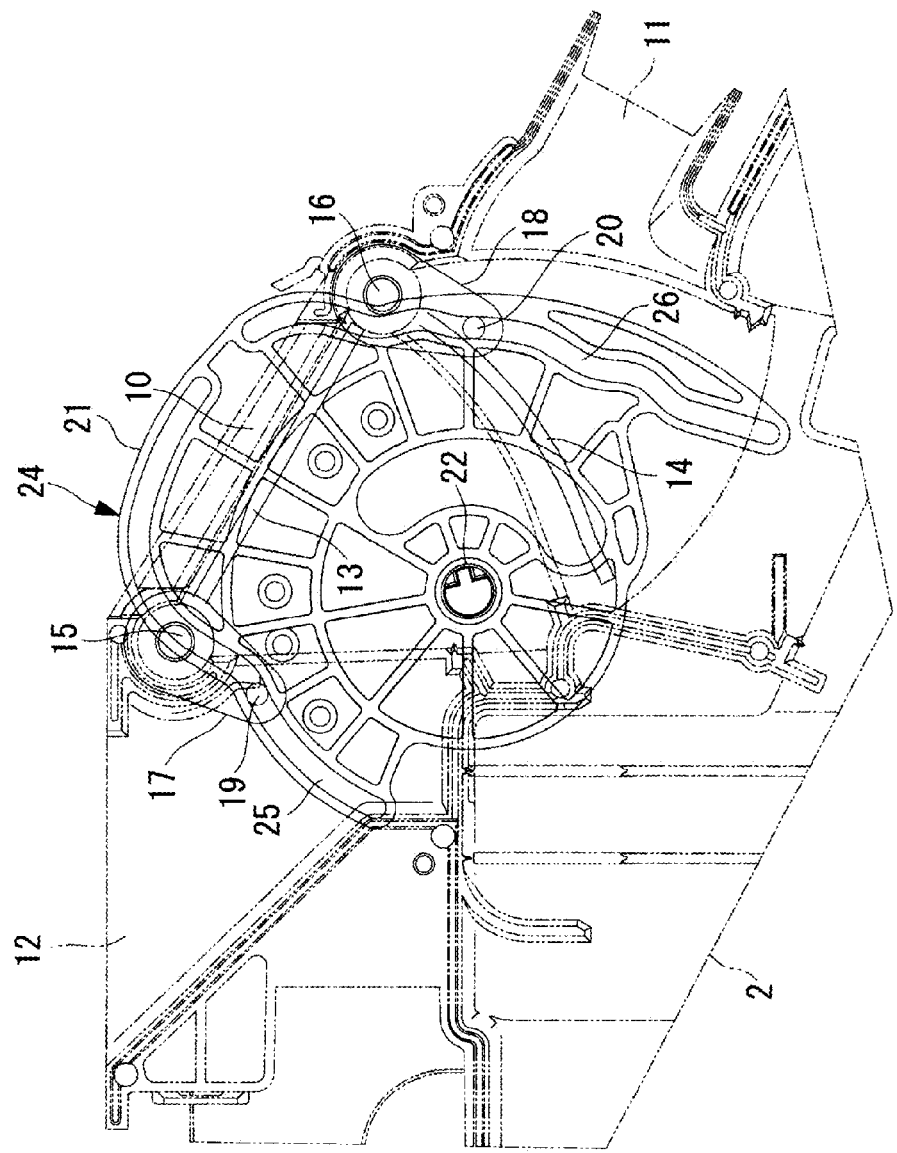
FIG. 11 is a side view illustrating an operation position of the link mechanism in a foot mode of the HVAC unit illustrated in FIG. 1.
Figure 12:
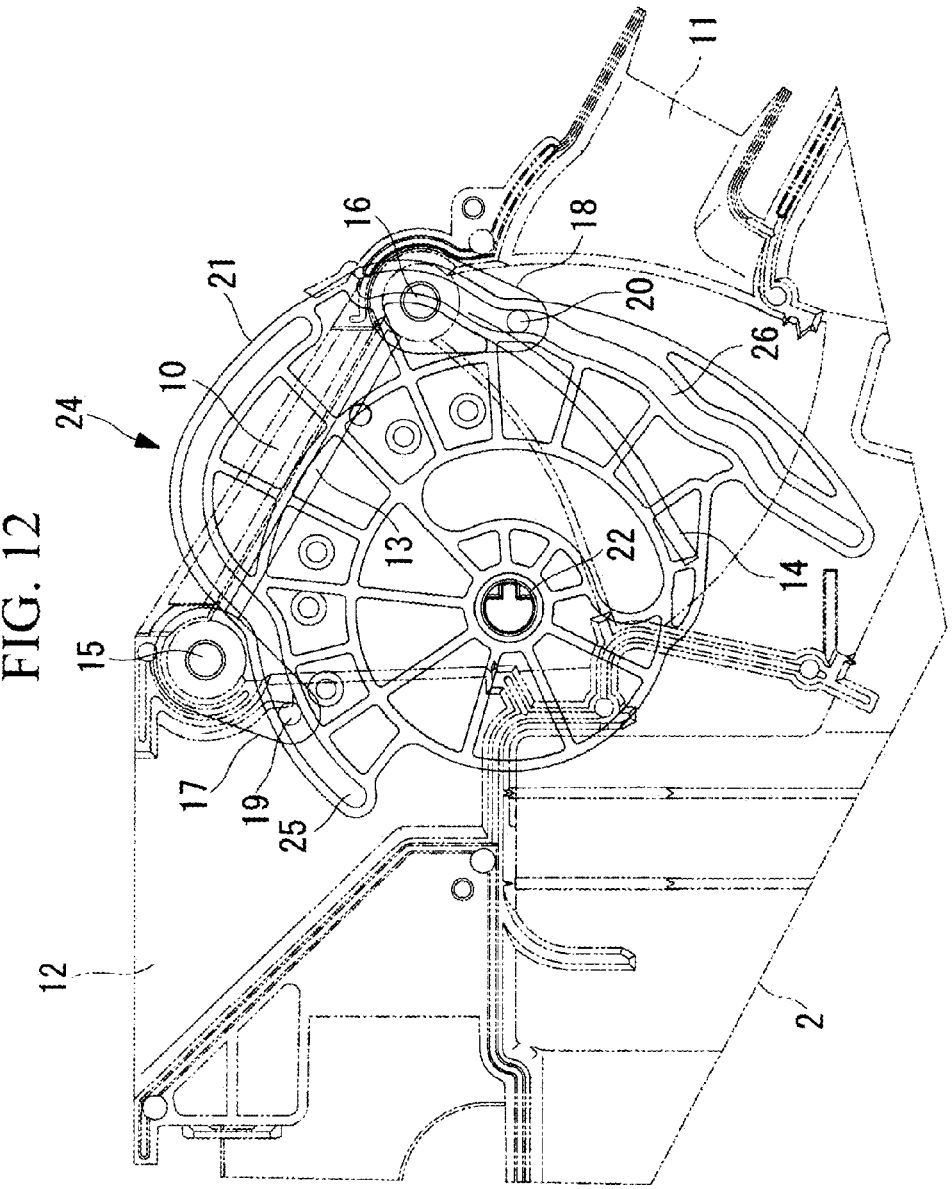
FIG. 12 is a side view illustrating an operation position of the link mechanism in a defroster/foot mode of the HVAC unit illustrated in FIG. 1.
Figure 13:
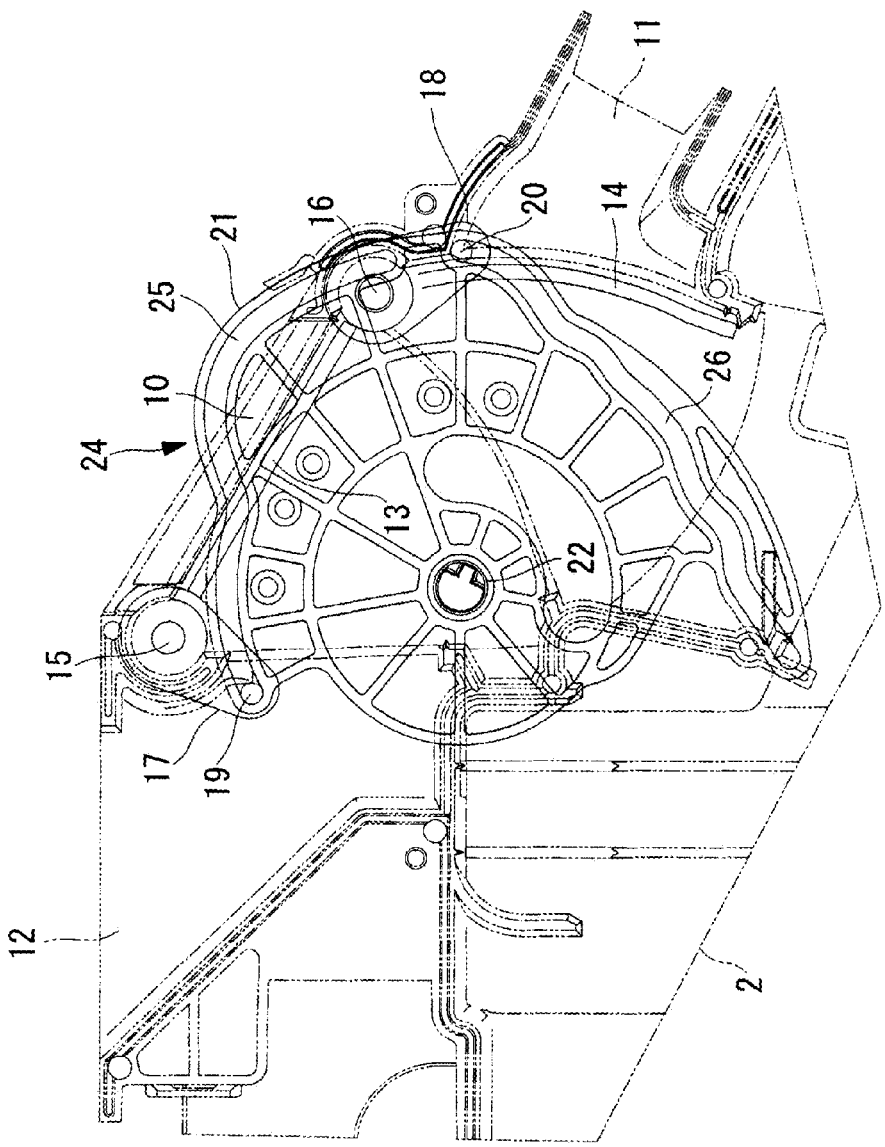
FIG. 13 is a side view illustrating an operation position of the link mechanism in a defroster mode of the HVAC unit illustrated in FIG. 1.

While the link 21 is rotated clockwise from the foot mode position illustrated in FIG. 11 to a defroster mode position illustrated in FIG. 13 via a defroster/foot mode position illustrated in FIG. 12, the groove portion 25C holds the lever 17 at its position without turning the lever 17, and keeps the defroster/face damper 13 at the position at which the defroster/face damper 13 fully closes part of the face blow-off channel 10 (center face blow-off channel).

Meanwhile, the cam groove 26 is a groove to which the pin 20 of the lever 18 is slidably fitted. As illustrated in FIG. 4, the cam groove 26 includes a groove portion 26A having a predetermined angular width. While the link 21 is rotated clockwise (in FIG. 4, rotated counterclockwise) from the face mode position illustrated in FIG. 9 to the high level mode position illustrated in FIG. 10, the groove portion 26A turns the lever 18 through a portion thereof having a substantially linearly reduced radius, opens the foot damper 14 from the position at which the foot damper 14 fully closes the foot blow-off channel 11, and turns the foot damper 14 to an intermediate position at which the foot damper 14 partially opens a passage to the face blow-off channel 10. The cam groove 26 includes a groove portion 26B having a predetermined angular width. The groove portion 26B is a wave-like groove, and is continuous with the groove portion 26A. While the link 21 is rotated clockwise from the high level mode position illustrated in FIG. 10 to the foot mode position illustrated in FIG. 11, the groove portion 26B closes the foot damper 14 to a position at which the foot damper 14 fully closes or slightly opens a passage to the face blow-off channel 10 and the defroster blow-off channel 12.

The cam groove 26 includes a groove portion 26C having an increased radius and a small angular width. The groove portion 26C is continuous with one end of the groove portion 26B. While the link 21 is rotated clockwise from the foot mode position illustrated in FIG. 11 to the defroster/foot mode position illustrated in FIG. 12, the groove portion 26C turns the foot damper 14 to an intermediate position at which the foot damper 14 partially opens a passage to the defroster blow-off channel 12. The cam groove 26 includes a groove portion 26D having a suddenly increased radius and a predetermined angular width. The groove portion 26D is continuous with one end of the groove portion 26C. While the link 21 is rotated clockwise from the defroster/foot mode position illustrated in FIG. 12 to the defroster mode position illustrated in FIG. 13, the groove portion 26D turns the foot damper 14 from the intermediate position to the position at which the foot damper 14 fully closes the foot blow-off channel 11.

Figure 5:
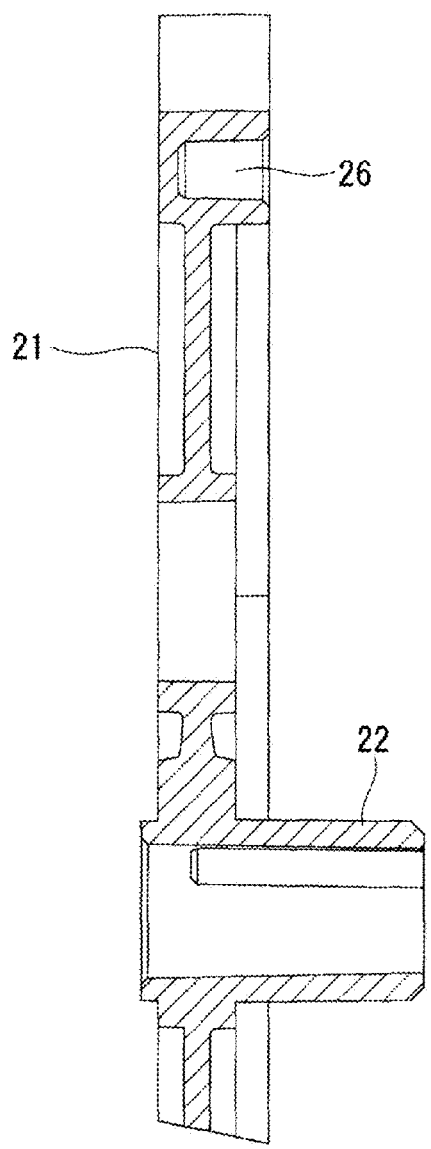
FIG. 5 is a view corresponding to an A-A cross-section in FIG. 4.
Figure 6:
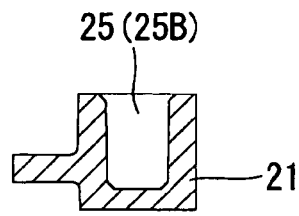
FIG. 6 is a view corresponding to a B-B cross-section in FIG. 4.
Figure 7:
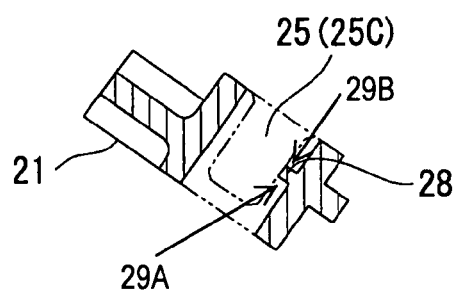
FIG. 7 is a view corresponding to a C-C cross-section in FIG. 4.
Figure 8:
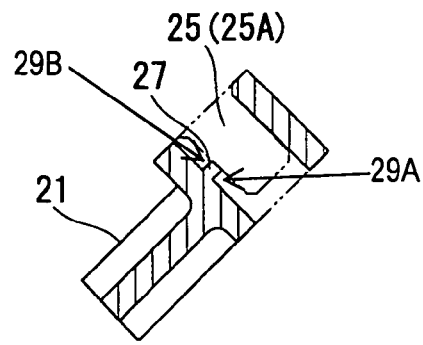
FIG. 8 is a view corresponding to a D-D cross-section in FIG. 4.

In the present embodiment, as illustrated in FIG. 7 and FIG. 8, rail portions 27 and 28 are respectively provided over the entire angular widths on inner side surfaces of the groove portion 25A and the groove portion 25C of the cam groove 25 to which the pin 19 of the lever 17 is slidably fitted, that is, on the inner side surfaces of the groove portion 25A and the groove portion 25C that do not turn but maintain the defroster/face damper 13 at their respective full-close positions for the face blow-off channel 10 and the defroster blow-off channel 12 even while the link 21 is turned. Such a rail portion is not provided in the groove portion 25B that connects the groove portion 25A to the groove portion 25C and the cam groove 26. As illustrated in FIG. 5 and FIG. 6, the cam groove 26 and the groove portion 25B are U-shaped in cross-section without a protruding rail.

Parts of the inner side surfaces of the groove portion 25A and the groove portion 25C are each formed into a linear protrusion, whereby the rail portions 27 and 28 are formed integrally in the respective grooves. Rail surfaces (sliding surfaces) of the rail portions 27 and 28 with which the pin 19 is in sliding contact have a width of, for example, approximately 1 mm, which is small enough to reduce sliding frictional force between the rail surfaces and the pin 19. Further, the rail portions 27 and 28 have protruding rail shapes that respectively protrude by, for example, approximately 1 mm from the inner side surfaces of the groove portion 25A and the groove portion 25C such that lower portions 29A, 29B are formed on both sides of each protruding rail.

The rail portion 27 provided in the groove portion 25A is formed on a surface of the groove portion 25A on the inner side in the radial direction for the following reason. That is, when the defroster/face damper 13 is maintained at its full-close position for the defroster blow-off channel 12, reactive force caused by a seal member or the like acts in a direction in which the defroster/face damper 13 is rotated counterclockwise in FIG. 9 and FIG. 10, and the pin 19 of the lever 17 comes into sliding contact with the surface of the cam groove 25 on the inner side in the radial direction. In contrast, the rail portion 28 provided in the groove portion 25C is formed on a surface of the groove portion 25C on the outer side in the radial direction for the following reason. That is, when the defroster/face damper 13 is maintained at its full-close position for part of the face blow-off channel (center face blow-off channel), the reactive force caused by the seal member or the like acts in a direction in which the defroster/face damper 13 is rotated clockwise in FIG. 11 to FIG. 13, and the pin 19 of the lever 17 comes into sliding contact with the surface of the cam groove 25 on the outer side in the radial direction.

Figure 3:
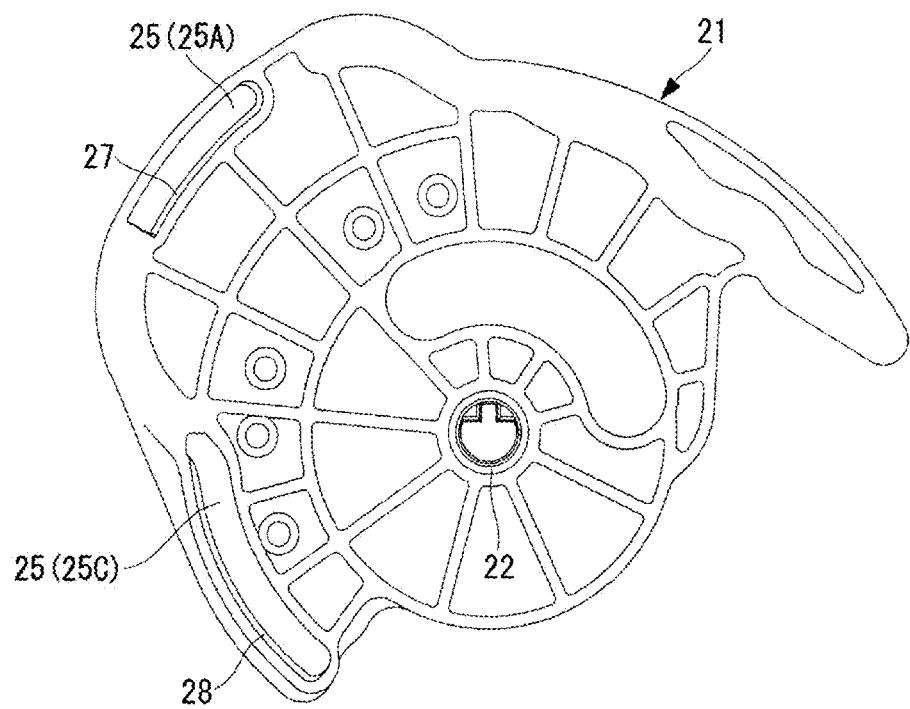
FIG. 3 is a side view of a link of a link mechanism that turns blow-off mode switching dampers in the HVAC unit illustrated in FIG. 1.

As illustrated in FIGS. 3, 7, and 8, the groove portion 25A and the groove portion 25C are through-grooves that penetrate the plate-like link 21, in order to secure the formability, and the groove portion 25A and the groove portion 25C can be respectively cut out on both sides of the rail portions 27 and 28.

The above-mentioned configuration according to the present embodiment produces the following actions and operations.

In the HVAC unit 1, the temperature-regulated air having temperature regulated by the evaporator 4, the heater core 8, and the air mixing damper 7 is blown off from the face blow-off channel 10, the foot blow-off channel 11, and the defroster blow-off channel 12 into the chamber, to thereby serve for air conditioning in the chamber. The temperature-regulated air is blown off in any of the blow-off modes that can be selectively switched by turning the defroster/face damper 13 and the foot damper 14, that is, in any of: the face mode in which the temperature-regulated air is blown off from the face blow-off channel 10; the high level mode in which the temperature-regulated air is blown off from both the face blow-off channel 10 and the foot blow-off channel 11; the foot mode in which the temperature-regulated air is blown off from the foot blow-off channel 11; the defroster/foot mode in which the temperature-regulated air is blown off from both the foot blow-off channel 11 and the defroster blow-off channel 12; and the defroster mode in which the temperature-regulated air is blown off from the defroster blow-off channel 12.

The defroster/face damper 13 and the foot damper 14 are each turned to selected one of the above-mentioned blow-off mode positions in the following manner. That is, the actuator 23 is driven through automatic control or an operation of an operator, and the link 21 is thus turned. Consequently, the levers 17 and 18 are turned by a predetermined angle range at predetermined timing through the pins 19 and 20 that are slidably fitted to the cam grooves 25 and 26 of the link 21, respectively, and the rotating shafts 15 and 16 are thus rotated. Here, the timing and range of the turning of the defroster/face damper 13 are adjusted correspondingly to the groove portions 25A, 25B, and 25C of the cam groove 25, and the timing and range of the turning of the foot damper 14 are adjusted correspondingly to the groove portions 26A, 26B, 26C, and 26D of the cam groove 26.

Figure 9:
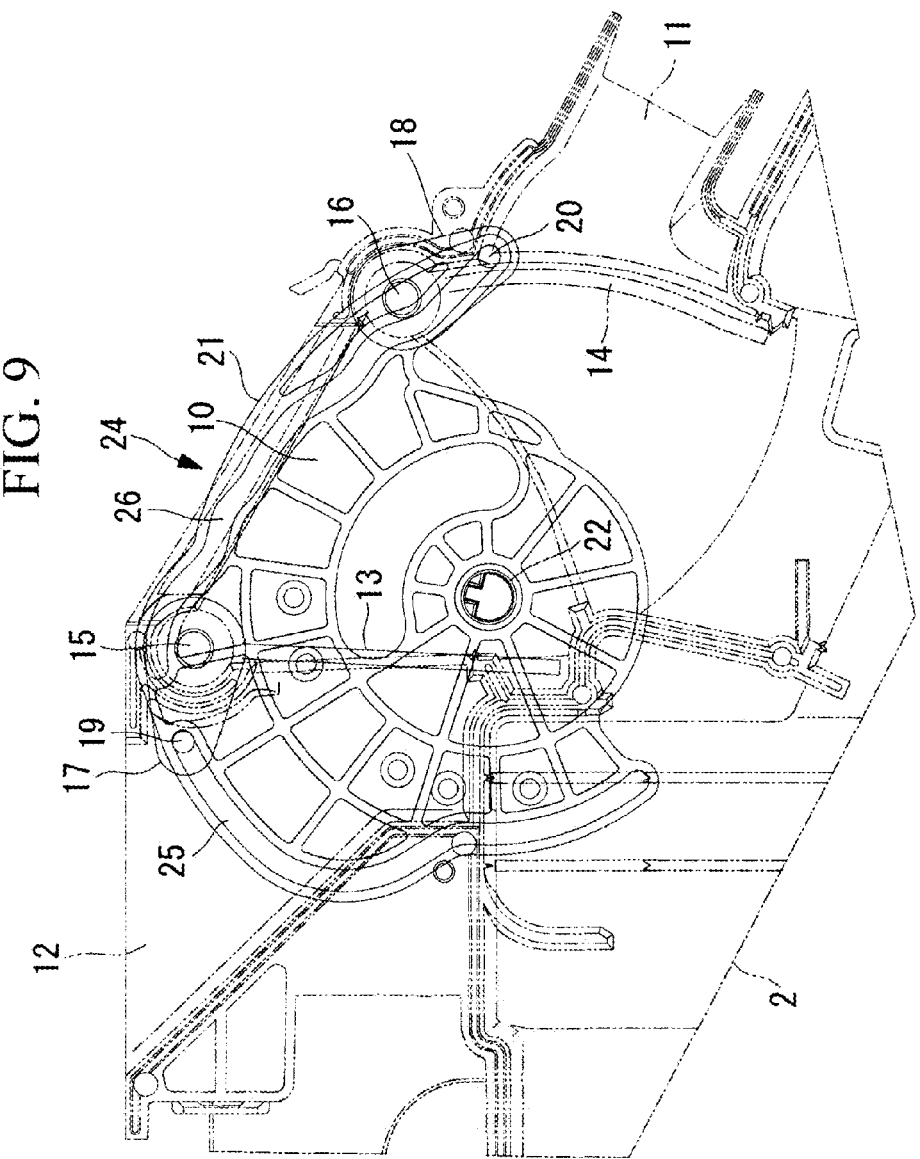
FIG. 9 is a side view illustrating an operation position of the link mechanism in a face mode of the HVAC unit illustrated in FIG. 1.
Figure 10:
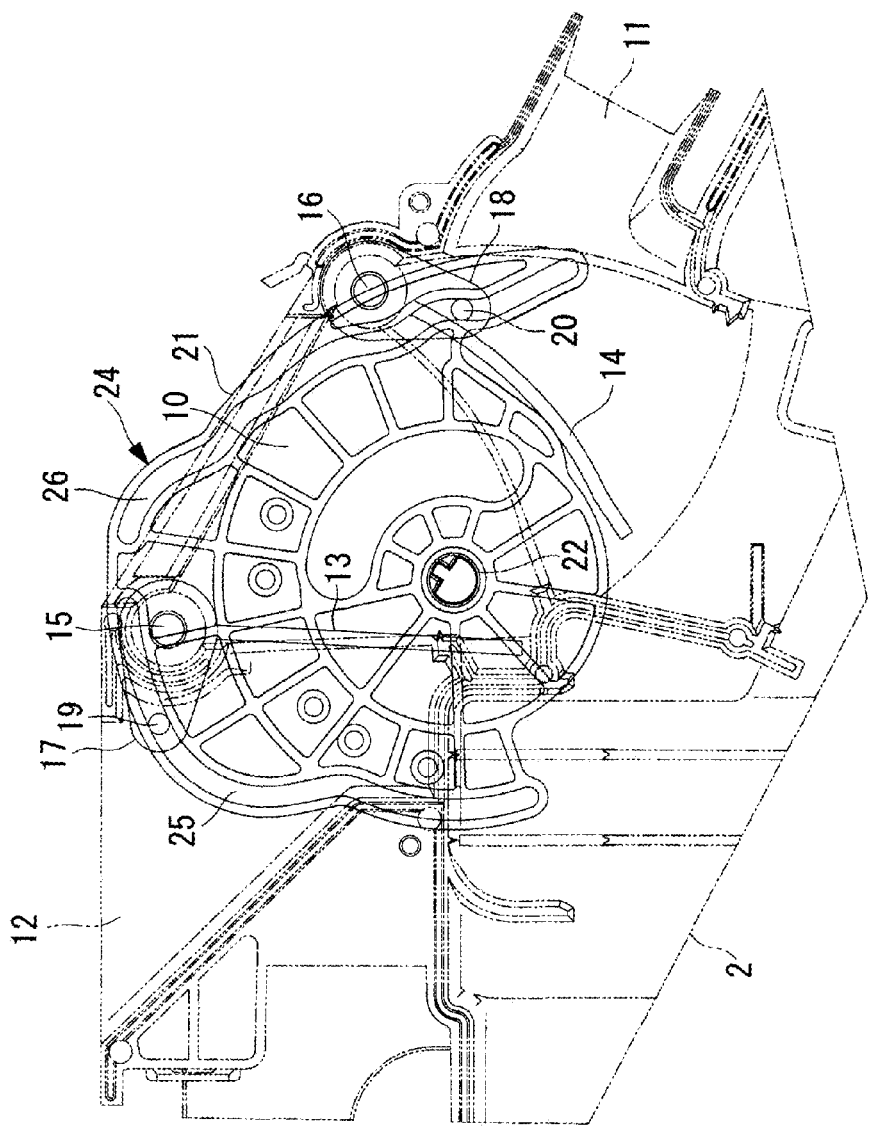
FIG. 10 is a side view illustrating an operation position of the link mechanism in a high level mode of the HVAC unit illustrated in FIG. 1.

Meanwhile, the defroster/face damper 13 is maintained at its full-close position for the defroster blow-off channel 12, while the link 21 is turned between the face mode position illustrated in FIG. 9 and the high level mode position illustrated in FIG. 10. Accordingly, the repulsive force that is caused by the seal member or the like when the defroster/face damper 13 is pushed against its full-close position acts as frictional force on a contact surface between the pin 19 of the lever 17 and the cam groove 25 through the rotating shaft 15. Similarly, the defroster/face damper 13 is maintained at its full-close position for part of the face blow-off channel 10 (center face blow-off channel), while the link 21 is turned between the foot mode position illustrated in FIG. 11 and the defroster mode position illustrated in FIG. 13 via the defroster/foot mode position illustrated in FIG. 12. Accordingly, the repulsive force that is caused by the seal member or the like and is applied to the defroster/face damper 13 acts as frictional force on a contact surface between the pin 19 of the lever 17 and the cam groove 25.

Then, in such a range as described above, the rail portions 27 and 28 are respectively provided on the inner side surfaces of the groove portion 25A and the groove portion 25C of the cam groove 25 on which the pin 19 slides, and hence the pin 19 slides on the cam groove 25 in contact with the rail surfaces of the rail portions 27 and 28, the rail surfaces having a width of 1 mm and a height of 1 mm, for example. With this configuration, even if foreign substances such as fine dusts enter the sliding portion between the cam groove 25 and the pin 19, the foreign substances can be cleared into the lower portions on both sides of the rail portions 27 and 28, so that the foreign substances can be less likely to be caught in the contact surface between the pin 19 and the rail surfaces. Accordingly, it is possible to suppress abnormal noise that is generated when the foreign substances are caught in the sliding surface (rail surface) between the cam groove 25 and the pin 19.

The contact surface between the groove portion 25A and the groove portion 25C of the cam groove 25 and the pin 19 is made smaller by providing the rail portions 27 and 28, and the sliding frictional force can thus be effectively reduced. Hence, the operability of the link mechanism 24 that turns the defroster/face damper 13 and the foot damper 14 can be enhanced. As a result, grease does not need to be applied to the sliding surface of the cam groove 25 in order to increase sliding properties, and such elimination of the need to apply grease can enhance assembly efficiency and reduce costs.

Further, the rail portions 27 and 28 are formed integrally by respectively forming, into linear protrusions, parts of the inner side surfaces of the groove portion 25A and the groove portion 25C of the cam groove 25. Hence, the rail portions 27 and 28 having a given rail width and a given rail height can be easily formed integrally with the inner side surfaces of the groove portion 25A and the groove portion 25C of the cam groove 25 by respectively forming parts thereof into the linear protrusions. Accordingly, it is possible to easily form the rail portions 27 and 28 having the best width and height to reduce the catching of foreign substances and the sliding frictional force, while suppressing an increase in costs caused by separately providing the rail portions 27 and 28.

The rail portions 27 and 28 are respectively provided in only the groove portion 25A and the groove portion 25C on the inner side surface of the cam groove 25, and the groove portion 25A and the groove portion 25C correspond to regions in which the sliding frictional force between the pin 19 and the cam groove 25 is increased by the reactive force that is caused when the defroster/face damper 13 as one of the blow-off mode switching dampers is pushed against the position at which the defroster/face damper 13 fully closes the defroster blow-off channel 12 or part of the face blow-off channel 10 (center face blow-off channel). With this configuration, the sliding frictional force between the cam groove 25 and the pin 19 in those regions can be effectively reduced. Accordingly, it is possible to enhance the operability of the link mechanism 24, eliminate the need to apply grease, and effectively suppress the generation of abnormal noise and the like.

In particular, when the defroster/face damper 13 as one of the blow-off mode switching dampers is pushed against its full-close position, the rotating shaft 15 receives turning force opposite to its closing direction due to the repulsive force caused by the seal member (packing) or the like, and the received force is applied to the contact surface between the pin 19 provided to the lever 17 and the cam groove 25. Accordingly, it is possible to solve such a trouble that large frictional force, which is generated when the link 21 is turned, causes a decrease in the operability of the link mechanism 24 as well as abnormal noise that is generated when foreign substances are caught in. In a region in which the blow-off mode switching dampers 13 and 14 are turned together with the link 21, large sliding frictional force is not generated, and hence such a rail portion as described above does not need to be provided in the groove portion 25B and the cam groove 26 corresponding to the region.

{Second Embodiment}

Next, a second embodiment of the present invention is described with reference to FIG. 14 and FIG. 15.

The present embodiment is different from the first embodiment in the configuration of rail portions 27A and 28A. The other features are the same as those of the first embodiment, and hence description thereof is omitted.

Figure 14:
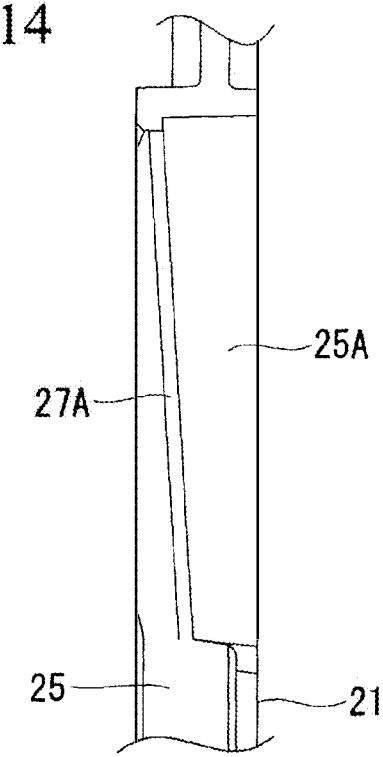
FIG. 14 is a view corresponding to an E-E cross-section in FIG. 4, the view illustrating a vehicle air conditioning device (HVAC unit) according to a second embodiment of the present invention.
Figure 15:
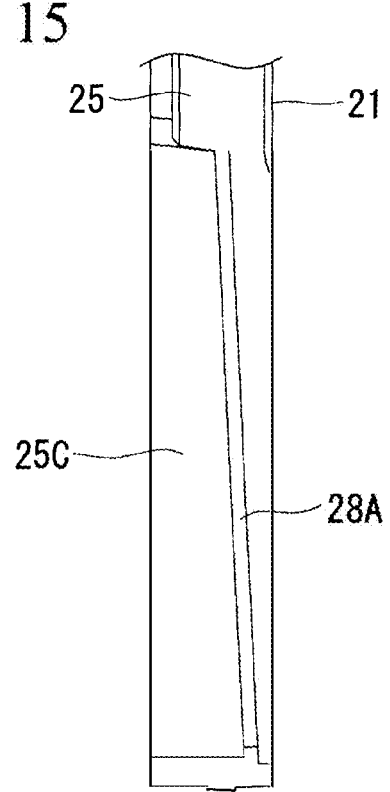
FIG. 15 is a view corresponding to an F-F cross-section in FIG. 4, the view illustrating the vehicle air conditioning device (HVAC unit) according to the second embodiment of the present invention.

In the present embodiment, as illustrated in FIG. 14 and FIG. 15, the rail portions 27A and 28A are respectively provided so as to be not parallel but slightly oblique to the length directions of the groove portion 25A and the groove portion 25C.

As described above, the rail portions 27A and 28A are slightly obliquely provided in the groove portions 25A and 25C of the cam groove 25, respectively, whereby the position of the contact surface (sliding surface) of the pin 19 that comes into contact with the rail portions 27A and 28A can be changed with respect to the axial direction (length direction) of the pin 19. Accordingly, it is possible to avoid intensive abrasion of the contact surface of the pin 19, prevent an increase in operation torque due to sliding friction, stabilize the operability of the link mechanism 24, and effectively suppress the generation of abnormal noise and the like.

The inclinations of the rail portions 27A and 28A can be respectively set as appropriate within the widths of the groove portions 25A and 25C.

{Third Embodiment}

Next, a third embodiment of the present invention is described.

The present embodiment is different from the first and second embodiments in that a rail portion corresponding to the rail portions 27, 27A, 28, and 28A is provided to the pin 19 of the lever 17. The other features are the same as those of the first and second embodiments, and hence description thereof is omitted.

In the present embodiment, the protruding rail portion having a predetermined width and a predetermined height (a width and a height similar to those of the rail portions 27, 27A, 28, and 28A) is provided in a ring-like pattern or obliquely in a spiral-like pattern, over the entire circumference on an outer peripheral surface of the pin 19 that slides on the cam groove 25 while the link 21 is turned.

Even the configuration as described above, in which the protruding rail portion is provided in the ring-like pattern or obliquely in the spiral-like pattern on the outer peripheral surface of the pin 19, can produce effects similar to those of the first embodiment. That is, foreign substances can be less likely to be caught in the rail surface on which the cam groove 25 and the pin 19 come into contact with each other. Accordingly, it is possible to suppress abnormal noise that is generated when the foreign substances are caught in the sliding surface (rail surface) between the cam groove 25 and the pin 19. Further, the sliding frictional force can be reduced by making the sliding surface between the cam groove 25 and the pin 19 smaller. Accordingly, the operability of the link mechanism 24 can be enhanced, and elimination of the need to apply grease can enhance assembly efficiency and reduce costs. Because the rail portion is provided in the spiral pattern, the position of the contact surface of the cam groove 25 with the pin 19 can be changed in the groove width direction. Accordingly, it is possible to avoid intensive abrasion of the contact surface of the cam groove 25.

The present invention is not limited to the invention according to the above-mentioned embodiments, and can be modified as appropriate within a range that does not depart from the gist thereof. For example, in the above-mentioned embodiments, description is given of an example in which the two blow-off mode switching dampers, that is, the defroster/face damper 13 and the foot damper 14 are provided for the three blow-off channels of the face blow-off channel 10, the foot blow-off channel 11, and the defroster blow-off channel 12, but it goes without saying that the present invention can be similarly applied to a HVAC unit in which a blow-off mode switching damper is provided for each of the three blow-off channels.

In the case where the number of blow-off mode switching dampers is changed and where a region exists in which any of the dampers needs to be maintained at its full-close position while the link 21 is turned, as a matter of course, a similar rail portion may be provided to a cam groove or a pin corresponding to the region.

REFERENCE SIGNS LIST

1 vehicle air conditioning device (HVAC unit)
10 face blow-off channel
11 foot blow-off channel
12 defroster blow-off channel
13 defroster/face damper (blow-off mode switching damper)
14 foot damper (blow-off mode switching damper)
15, 16 rotating shaft
17, 18 lever 19, 20 pin
21 link
24 link mechanism
25, 26 cam groove
25A, 25C groove portion (a groove in a region in which a damper is kept at its full-close position)
27, 27A, 28, 28A rail portion

The invention claimed is:

1. A vehicle air conditioning device comprising:
   a plurality of blow-off mode switching dampers that are turnably provided in a plurality of blow-off channels that blow off temperature-regulated air into a chamber; and
   a link mechanism including:
      a lever provided to a rotating shaft of each blow-off mode switching damper; and
      a turnable link including a plurality of cam grooves on each of which a pin provided to the lever slides each cam groove having an inner side wall forming an inner side surface,
   the blow-off mode switching dampers being turned by the link mechanism, for enabling selective switching of blow-off modes, wherein
      a rail portion as a linear protrusion extends from any one of the inner side surface of each cam groove and an outer peripheral surface of each pin, the rail portion being flanked on both sides by lower portions, and
      the cam groove and the pin are in contact with each other through the rail portion.

2. The vehicle air conditioning device according to claim 1, wherein
   the rail portion is formed integrally by forming, into a linear protrusion, part of the inner side surface of the cam groove or the outer peripheral surface of the pin.

3. The vehicle air conditioning device according to claim 1, wherein
   the rail portion is obliquely provided at a predetermined inclination on the inner side surface of the cam groove or the outer peripheral surface of the pin.

4. The vehicle air conditioning device according to claim 1, wherein
   the rail portion is provided on the inner side surface of the cam groove in only a region in which sliding frictional force is increased by reactive force that is caused when one of the blow-off mode switching dampers is pushed against a full-close position thereof.

5. The vehicle air conditioning device according to claim 4, wherein
   the rail portion is provided in a range in which the link is turned while a defroster/face damper provided between a defroster blow-off channel and a face blow-off channel of the blow-off channels is pushed by the link mechanism against a position at which the defroster/face damper fully closes the defroster blow-off channel or part of the face blow-off channel.

6. A vehicle air conditioning device comprising:
   a plurality of blow-off mode switching dampers that are turnably provided in a plurality of blow-off channels that blow off temperature-regulated air into a chamber; and
   a link mechanism including:
      a lever provided to a rotating shaft of each blow-off mode switching damper;
      a turnable link including a plurality of cam grooves on each of which a pin provided to the lever slides,
   the blow-off mode switching dampers being turned by the link mechanism, for enabling selective switching of blow-off modes,
   wherein the vehicle air conditioning device further comprises a rail portion formed in any one of an inner side surface of each cam groove and an outer peripheral surface of each pin,
   wherein the rail portion has a linear protrusion that extends from any one of the inner side surface of each cam groove and the outer peripheral surface of each pin and is formed over a predetermined length along any one of the inner side surface of each cam groove and the outer peripheral surface of each pin; and
   wherein the cam groove and the pin are in contact with each other through the rail portion.

* * * * *